US008942162B2

United States Patent
Tseng

(10) Patent No.: US 8,942,162 B2
(45) Date of Patent: Jan. 27, 2015

(54) METHOD AND APPARATUS OF CONTINUOUS PACKET CONNECTIVITY ENHANCEMENT IN A WIRELESS COMMUNICATIONS SYSTEM

(75) Inventor: Li-Chih Tseng, Taipei (TW)

(73) Assignee: Innovative Sonic Limited, Ebene (MU)

( * ) Notice: Subject to any disclaimer, the term of this patent is extended or adjusted under 35 U.S.C. 154(b) by 1305 days.

(21) Appl. No.: 12/003,029

(22) Filed: Dec. 19, 2007

(65) Prior Publication Data

US 2008/0144508 A1  Jun. 19, 2008

Related U.S. Application Data

(60) Provisional application No. 60/875,525, filed on Dec. 19, 2006, provisional application No. 60/877,164, filed on Dec. 27, 2006.

(51) Int. Cl.
*H04W 4/00* (2009.01)
*H04W 28/06* (2009.01)
*H04L 1/00* (2006.01)
*H04L 1/18* (2006.01)

(52) U.S. Cl.
CPC ............. *H04W 28/06* (2013.01); *H04L 1/0026* (2013.01); *H04L 1/1812* (2013.01)
USPC ........................................................ 370/328

(58) Field of Classification Search
USPC ................................................. 370/310, 328
See application file for complete search history.

(56) References Cited

U.S. PATENT DOCUMENTS

| | | | |
|---|---|---|---|
| 6,631,125 | B1 | 10/2003 | Longoni |
| 2001/0053140 | A1 | 12/2001 | Choi |
| 2003/0103491 | A1 | 6/2003 | Frederiksen et al. |
| 2003/0147348 | A1* | 8/2003 | Jiang .............................. 370/229 |
| 2003/0147371 | A1 | 8/2003 | Choi et al. |
| 2005/0201474 | A1 | 9/2005 | Cho et al. |
| 2006/0203856 | A1 | 9/2006 | Laroia |
| 2006/0268764 | A1 | 11/2006 | Harris |
| 2007/0177569 | A1* | 8/2007 | Lundby ......................... 370/349 |
| 2008/0056229 | A1* | 3/2008 | Gholmieh et al. ............ 370/349 |

FOREIGN PATENT DOCUMENTS

| | | |
|---|---|---|
| CN | 1679364 A | 10/2005 |
| KR | 1020080049643 | 6/2008 |
| TW | 200623737 A | 7/2006 |

(Continued)

OTHER PUBLICATIONS

3GPP TSG-RAN WG1 Meeting #47 R1-063560, "Support of CPC feature", Nov. 10, 2006.*

(Continued)

*Primary Examiner* — Brandon Renner
*Assistant Examiner* — Scott M Sciacca
(74) *Attorney, Agent, or Firm* — Blue Capital Law Firm, P.C.

(57) ABSTRACT

In order to improve continuous packet connectivity (CPC), the present invention provides a method of improving CPC for a UE working in a HS-SCCH less operation in a wireless communications system. The method includes treating a received data as a specific data to be decoded when the received data is the data of the third transmission for a base station and the data in a soft buffer pointed by the third transmission is not the second transmission for the base station in the wireless communications system.

6 Claims, 4 Drawing Sheets

(56) References Cited

FOREIGN PATENT DOCUMENTS

| TW | 200625863 A | 7/2006 |
|---|---|---|
| TW | 200633442 A | 9/2006 |
| WO | 2005002269 A1 | 1/2005 |
| WO | 2006016212 A1 | 2/2006 |
| WO | 2006085800 A1 | 8/2006 |
| WO | 2006130741 A1 | 12/2006 |

OTHER PUBLICATIONS

3GPP TSG-RAN WG2 Meeting #56 R2-063308, "Introduction of DTX-DRX and HS-SCCH less in MAC", Nov. 1, 2006.*

3GPP TSG-RAN WG2 Meeting #56 R2-063567, "Introduction of DTX-DRX and HS-SCCH less in RRC", Nov. 13, 2006.*

Qualcomm Europe et al., "Introduction of DTX-DRX and HS-SCCH less in RRC", 3GPP TSG-RAN WG2 Meeting #56, Tdoc R2-063309, p. 4, p. 6, p. 37-p. 39, 3rd Generation Partnership Project, Nov. 10, 2006, URL: http://www.3gpp.org/ftp/tsg_ran/WG2_RL2/TSGR2_56/Documents/R2-063309.zip.

Qualcomm Europe, "TP for HS-SCCH-less operation for Continuous Packet Connectivity", 3GPP TSG-RAN WG1 #44bis, R1-060946, p. 1-p. 2, 3rd Generation Partnership Project, Mar. 31, 2006, URL: http://www.3gpp.org/ ftp/tsg_ran/WG1_RL1/TSGR1_44bis/Docs/R1-060946.zip.

Qualcomm Europe: "TP on Reduced Complexity HS-SCCH-less Operation", 3GPP TSG-RAN WG1 #46, R1-062421, Aug. 28-Sep. 1, 2006, pp. 1-10, XP002594620, Tallinn, Estonia.

3GPP TSG-RAN WG2 Meeting #56 R2-063567, "Introduction of DTX-DRX and HS-SCCH less in RRC", (Nov. 13, 2006).

3GPP TSG-RAN WG2 Meeting #56 R2-063308, "Introduction of DTX-DRX and HS-SCCH less in MAC", (Nov. 1, 2006).

3GPP TSG-RAN WG1 Meeting #47 R1-063560, "Support of CPC feature", (Nov. 10, 2006).

3GPP TR 25.903 V1.2.0, Technical Specification Group Radio Access Network; Continuous Connectivity for Packet Data Users, p. 127, Line 5-40, (dated Nov. 2006).

Office Action on corresponding foreign application (TW 96148631) from TIPO dated May 16, 2011.

Office Action on corresponding foreign application (TW 96148633) from TIPO dated Jul. 14, 2011.

* cited by examiner

METHOD AND APPARATUS OF CONTINUOUS PACKET CONNECTIVITY ENHANCEMENT IN A WIRELESS COMMUNICATIONS SYSTEM

CROSS REFERENCE TO RELATED APPLICATIONS

This application claims the benefit of U.S. Provisional Application No. 60/875,525, filed on Dec. 19, 2006 and entitled "Method and Apparatus for Improving Continuous Packet Connectivity (CPC)" and the benefit of U.S. Provisional Application No. 60/877,164, filed on Dec. 27, 2006 and entitled "Method and Apparatus for improving downlink DRX", the contents of which are incorporated herein by reference.

BACKGROUND OF THE INVENTION

1. Field of the Invention

The present invention relates to a method and related apparatus for improving continuous packet connectivity (CPC) for a user equipment in a wireless communications system, and more particularly, to a method and related apparatus for improving HS-SCCH less operation in CPC for a user equipment in a wireless communications system.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

For HSDPA and HSUPA, the 3rd Generation Partnership Project (3GPP) provides a continuous packet connectivity (CPC) protocol specification, which includes features that, for user equipments (UEs) in CELL_DCH state, aim to significantly increase the number of packet data users for a cell, reduce the uplink noise rise and improve the achievable download capacity for VoIP.

For an HSDPA UE, the UE can work in a special mode, HS-SCCH less operation, included in CPC. Under this mode, a high speed shared control channel (HS-SCCH) is not transmitted with the first hybrid automatic repeat request (HARQ) transmission. In the HS-SCCH less operation, the UE receives a high speed physical downlink shared channel (HS-PDSCH) according to required control signals received when the HS-SCCH less operation is enabled, such as "channelization-code-set", "modulation scheme", "transport-block size", "UE identity" and etc., for reducing HS-SCCH overhead for a HARQ process, thereby reducing UE power consumption. Note that in the HS-SCCH less operation, the same data is limited to 3 transmissions at most, in other words, the HARQ is limited to 2 retransmissions.

For a detailed HARQ procedure for the HS-SCCH less operation, please refer to associated communications protocol specification of 3GPP. When the HS-SCCH less operation is enabled, the lower layers will provide a MAC-hs PDU at each transmission time interval (TTI), and the UE places the data of the first transmission in a soft buffer, replacing any data previously stored in the soft buffer. Next, the UE decodes the data in the soft buffer for the MAC-hs PDU according to the control signals received when the HS-SCCH less operation is enabled. If the data has been decoded successfully, the UE will report a positive acknowledgement (ACK) to the base station, also known as Node-B, and wait for a new transmission. For the first transmission, if the data has not been decoded successfully, the UE will not report a negative acknowledgement (NAK) to the Node-B and just wait for the second transmission. During the second and the third transmission, the control signals, such as "second or third transmission" and "pointer to the previous transmission", are transmitted by the HS-SCCH.

Next, for the second transmission, the UE gets the data of the first transmission in the soft buffer according to the control signals, "second or third transmission" and "pointer to the previous transmission", and combines the data of the first and the second transmission to be a first combined data. Then, the UE decodes the first combined data according to the controls signals in the second transmission. If the first combined data has been decoded successfully, the UE will report an ACK to the Node-B and wait for a new transmission. Otherwise, the UE will store the first combined data in a soft buffer, report a NAK to the Node-B and wait for the third transmission.

Similarly, for the third transmission, the UE gets the first combined data in the soft buffer according to the control signal, "second or third transmission" and "pointer to the previous transmission", and combines the first combined data with the data of the third transmission to be a second combined data. Then, the UE decodes the second combined data according to the controls signals in the third transmission. If the second combined data has been decoded successfully, the UE will report an ACK to the Node-B. Otherwise, the UE will report a NAK to the Node-B, and wait for a new transmission.

In the prior art, for the third transmission, the UE gets the first combined data in the soft buffer according to the control signal, "pointer to the previous transmission", combines the first combined data with the data of the third transmission to be a second combined data, and decodes the second combined data for decoding data more efficiently. However, in a poor communication quality environment, the UE may not receive the data of the second transmission, thus the data in the soft buffer obtained according to the control signals will not be the correct first combined data. In this situation, the data of the third transmission will be decoded unsuccessfully, for being combined with the failed decoded data.

In conclusion, in the HS-SCCH less operation, the lost data of the second transmission may result in unsuccessful decoding of the third transmission. In fact, the above condition may happen with the probability 1% at most in a poor communication quality environment.

SUMMARY OF THE INVENTION

The present invention provides a method and related apparatus for improving CPC for a user equipment in a wireless communications system.

The present invention discloses a method of improving CPC for a user equipment working in a HS-SCCH less operation in a wireless communications system. The method includes treating a received data as a specific data to be decoded when the received data is the data of the third transmission for a base station and the data in a soft buffer pointed by the third transmission is not the second transmission for the base station in the wireless communications system.

The present invention further discloses a communications device working in a HS-SCCH less operation of a wireless communications system utilized for improving CPC. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes treating a received data as a specific data to be decoded when the received data is the data of the third transmission for a base station and the data in a soft buffer pointed by the third transmission is not the second transmission for the base station in the wireless communications system.

The present invention further discloses a method of improving CPC for a base station working in a HS-SCCH less operation in a wireless communications system. The method includes treating the third transmission as the first transmission when the base station does not receive a NAK for the second transmission from a user equipment in the wireless communications system.

The present invention further discloses a communications device working in a HS-SCCH less operation of a wireless communications system utilized for improving CPC. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes treating the third transmission as the first transmission when the communications device does not receive a NAK for the second transmission from a user equipment in the wireless communications system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
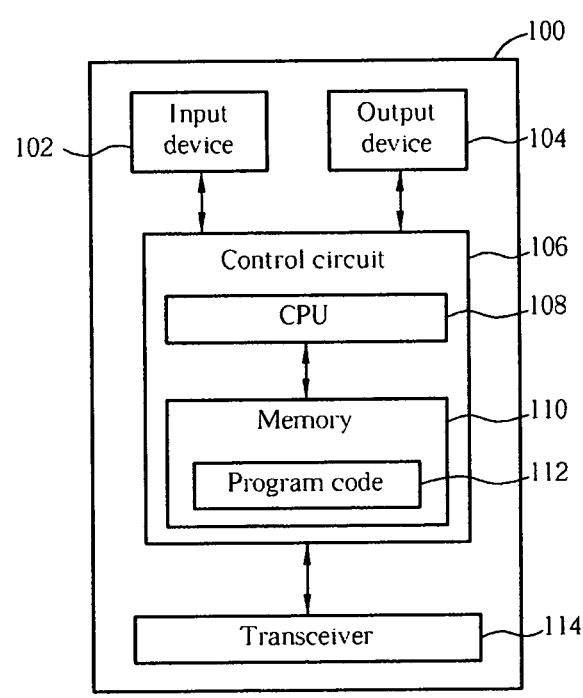
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
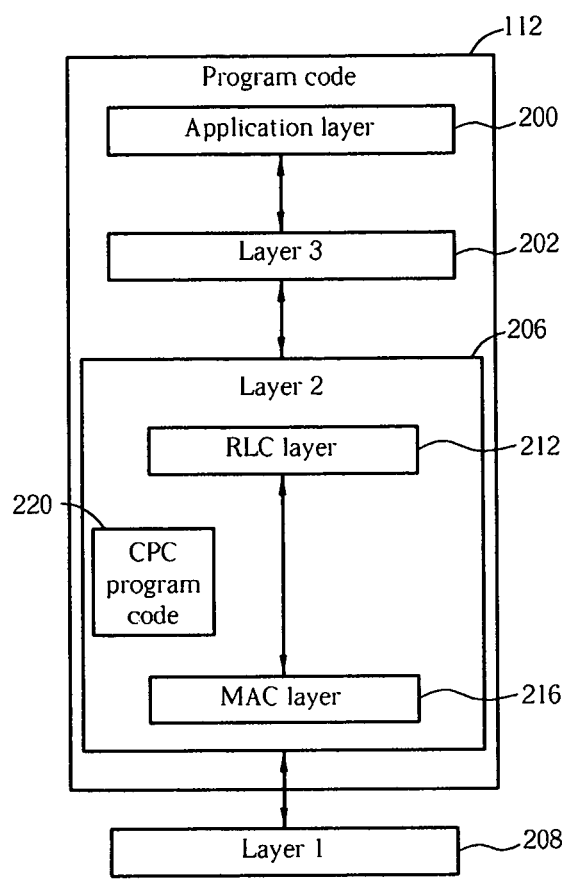
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 208. The Layer 3 202 is for performing radio resource control (RRC). The Layer 2 206 includes a radio control link (RLC) layer 212 and a media access control (MAC) layer 216 for performing link control, and the Layer 1 208 is a physical layer.

In the HS-SCCH less operation, the same data is limited to 3 transmissions at most. If the UE does not receive the data of the second transmission, inevitably, the data of the third transmission will be decoded unsuccessfully for being combined with the failed decoded data, thus effects of CPC will be reduced. In this situation, the embodiment of the present invention provides a CPC program code 220 for the program code 112 in the Layer 2 206, for improving CPC.

Figure 3:
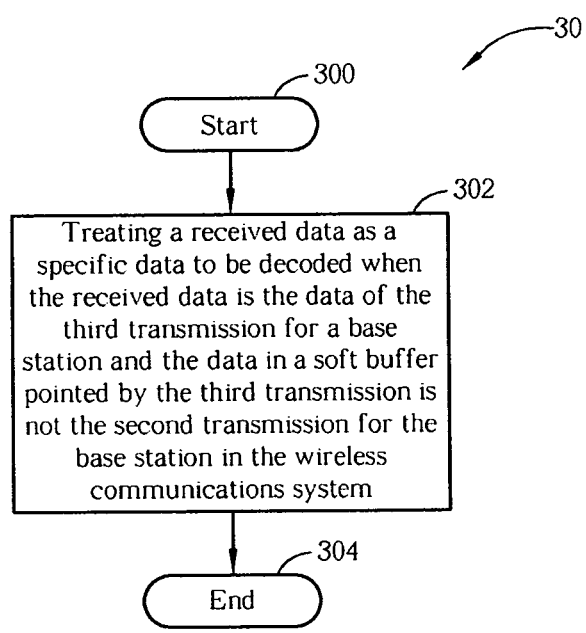
FIG. 3 and FIG. 4 are flowchart diagrams of a process according to an embodiment of the present invention.

Please refer to FIG. 3, which illustrates a schematic diagram of a process 30 according to an embodiment of the present invention. The process 30 is utilized for improving CPC for a UE working in a HS-SCCH less operation in a wireless communications system. The process 30 can be compiled into the CPC program code 220. The process 30 includes the following steps:

Step 300: Start.

Step 302: Treating a received data as a specific data to be decoded when the received data is the data of the third transmission for a base station and the data in a soft buffer pointed by the third transmission is not the second transmission for the base station in the wireless communications system.

Step 304: End.

In process 30, the embodiment of the present invention is treating the received data as the specific data to be decoded when the data in the soft buffer pointed by the third transmission is not the second transmission for the base station. In other words, the data of the third transmission is decoded only after checking whether the second transmission is received successfully, so as to decode data more efficiently.

If the data in the soft buffer pointed by the third transmission is the second transmission for the base station, the data of the third transmission can be decoded according to the prior art decoding procedure. On the contrary, if the data in the soft buffer pointed by the third transmission is not the second transmission for the base station, the embodiment of the present invention does not combine the data of the third transmission with the data in the buffer, but preferably treats the data of the third transmission as the data of the first transmission to be decoded according to the control signals received when the HS-SCCH less operation is enabled, or preferably treats the data of the third transmission as a combined data to be decoded. Therefore, the data of the third transmission may be successfully decoded.

On the other hand, if the UE does not receive the data of the second transmission because of poor communication quality environment, the UE will not report a negative acknowledgement (NAK) to the base station. Or, the UE receives the data of the second transmission but decodes unsuccessfully and also reports a NAK, but the base station does not receive the NAK. In other words, if the base station does not receive the NAK, the base station will know that the UE does not successfully receive the data of the second transmission. In this situation, if the base station treats the third transmission as the first transmission, that is, the base station will not transmit the control signals to the UE by the HS-SCCH, then, the UE can receive and directly decode the data of the third transmission according to the control signals received when the HS-SCCH less operation is enabled.

Figure 4:
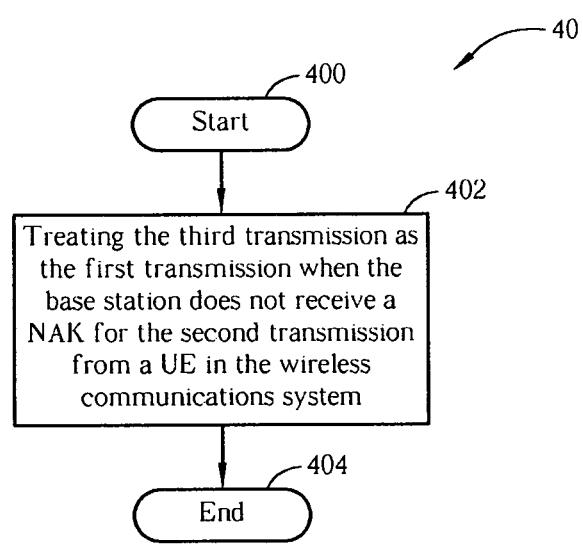

Please refer to FIG. 4, which illustrates a schematic diagram of a process 40 according to an embodiment of the present invention. The process 40 is utilized for improving CPC for a base station working in a HS-SCCH less operation in a wireless communications system. The process 40 can be compiled into the CPC program code 220. The process 40 includes the following steps:

Step 400: Start.
Step 402: Treating the third transmission as the first transmission when the base station does not receive a NAK for the second transmission from a UE in the wireless communications system.
Step 404: End.

In process 40, the base station can treat the third transmission as the first transmission, a new transmission, when the base station does not receive the NAK for the second transmission. As a result, the UE may successfully decode the data of the third transmission according to the control signals received when the HS-SCCH less operation is enabled.

In conclusion, in the HS-SCCH less operation, the present invention can make the data of the third transmission be decoded more efficiently, so as to improve CPC and enhance transmission efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of continuous packet connectivity (CPC) for a user equipment (UE) in a wireless communications system comprising:
   transmitting, by a base station, data of a first transmission working in a HS-SCCH (High Speed Shared Control Channel) less operation, wherein control signals are not transmitted in the HS-SCCH with the first transmission;
   receiving, by the UE, the data of the first transmission; and
   transmitting data of a second transmission by the base station, wherein:
      if the UE successfully detects the data of the second transmission:
         combining, by the UE, the data of the first transmission and the data of the second transmission to form a first combined date,
         decoding, by the UE, the first combined data,
         receiving, by the UE, data of a third transmission from the base station,
         combining, by the UE, the data of the third transmission with the first combined data to form a second combined data, and
         decoding, by the UE, the second combined data; and
      if the UE does not successfully detect the data of the second transmission:
         transmitting, by the base station, data of a third transmission, without transmitting any control signals to the UE by the HS-SCCH, when no NACK (Negative Acknowledgement) is received from the UE for the second transmission,
         receiving, by the UE, data of the third transmission, and
         directly decoding, by the UE, data of the third transmission if a data in a soft buffer pointed by the third transmission is not the second transmission such that the data of the third transmission is not combined with any previous transmissions.

2. The method of claim 1, wherein directly decoding data in the third transmission comprises treating the received data in the third transmission as the data in a first transmission for the base station to be decoded.

3. The method of claim 1, wherein directly decoding data in the third transmission comprises treating the received data in the third transmission as a combined data to be decoded.

4. A communications device working in a wireless communications system utilized for improving continuous packet connectivity (CPC) the communications device comprising:
   a control circuit for realizing functions of the communications device;
   a central processing unit installed in the control circuit for executing a program code; and
   a memory coupled to the central processing unit for storing the program code;
   wherein executing the program code further operates the control circuit to:
   transmit, by a base station, data of a first transmission working in a HS-SCCH (High Speed Shared Control Channel) less operation, wherein control signals are not transmitted in the HS-SCCH with the first transmission;
   receive, by the UE, the data of the first transmission; and
   transmit data of a second transmission by the base station, wherein:
      if the UE successfully detects the data of the second transmission:
         combine, by the UE, the data of the first transmission and the data of the second transmission to form a first combined data,
         decode, by the UE, the first combined data,
         receive, by the UE, data of a third transmission from the base station,
         combine, by the UE, the data of the third transmission with the first combined data to form a second combined data, and
         decode, by the UE, the second combined data; and
      if the UE does not successfully detect the data of the second transmission:
         transmit, by the base station, data of a third transmission, without transmitting any control signals to the UE by the HS-SCCH, when no NACK (Negative Acknowledgement) is received from the UE for the second transmission,
         receive, by the UE, data of the third transmission, and
         directly decode, by the UE, data of the third transmission if a data in a soft buffer pointed by the third transmission is not the second transmission such that the data of the third transmission is not combined with any previous transmissions.

5. The communications device of claim 4, wherein to directly decode data in the third transmission comprises treating the received data in the third transmission as the data in the first transmission for the base station to be decoded.

6. The communications device of claim 4, wherein to directly decode data in the third transmission comprises treating the received data in the third transmission as a combined data to be decoded.

* * * * *